United States Patent
Bestenreiner et al.

[11] 3,759,155
[45] Sept. 18, 1973

[54] METHOD OF PHOTOGRAPHIC COLOR RECORDING

[75] Inventors: Friedrich Bestenreiner, Grunwald near Munich; Reinhold Deml, Munich, both of Germany

[73] Assignee: Agfa-Gevaert Aktiengesellschaft, Leverkusen, Germany

[22] Filed: Jan. 10, 1972

[21] Appl. No.: 216,544

Related U.S. Application Data

[60] Division of Ser. No. 830,065, June 3, 1969, Pat. No. 3,641,895, which is a continuation-in-part of Ser. No. 803,676, March 3, 1969.

[30] Foreign Application Priority Data
Mar. 2, 1968    Germany............... P 16 22 865.2
June 4, 1968    Germany............... P 17 72 568.7

[52] U.S. Cl. .................................................. 95/12.2
[51] Int. Cl. .............................................. G03b 33/14
[58] Field of Search...................... 95/12.2, 12.21

[56] References Cited
UNITED STATES PATENTS
3,504,606    4/1970    Macovski............................. 95/12.2
3,533,340    10/1970   Macovski............................. 95/12.2
3,478,661    11/1969   Heckscher........................... 95/12.2
3,609,010    9/1971    Mueller................................ 95/12.2

*Primary Examiner*—John M. Horan
*Attorney*—Michael S. Striker

[57] ABSTRACT

A photographic objective, in whose plane a set of filter strips associated with different colors is located, forms an image on a black and white film while the lens elements of a lenticular grating form images of the set of colored strips on the corresponding areas of the film. All strip images together form a strip grating on the film so that the image formed by the objective can be reproduced as a color picture by the diffraction orders of the strip grating.

3 Claims, 6 Drawing Figures

METHOD OF PHOTOGRAPHIC COLOR RECORDING

CROSS-REFERENCE TO RELATED APPLICATION

This application is a division of our copending application, Ser. No. 830,065, filed June 3, 1969, now U.S. Pat. No. 3,641,895, which is a continuation-in-part of our application, Ser. No. 803,676, filed Mar. 3, 1969.

BACKGROUND OF THE INVENTION

The present invention relates to a method of photographic color recording.

Known arrangements for producing by means of a lenticular grating an image on a black and white film, and copying the black and white film to produce a color picture, have the disadvantage that due to difficulties in the co-incidence of the lenticular grating, it is hardly possible to make good reproductions.

SUMMARY OF THE INVENTION

It is an object of the invention to provide a method of recording on a black and white film by means of a lenticular grating in such a manner that the developed photographic film can be copied without difficulties.

Another object of the invention is to provide a novel and improved method of making color photographs.

Another object of the invention is to produce photographic recordings on a photographic surface which include a grating whose diffraction orders are used for printing and reproduction of the picture on the photographic film.

The improved method of photographic recording and reproduction comprises the steps of forming by an objective a photographic object image on a photosensitive surface which is sensitive to white light, forming by a lenticular grating having a frequency of at least 60 lines per millimeter a plurality of color images of a set of filter strips located at least behind parts of the objective and associated with different color components of light on the photosensitive surface so that a strip grating composed of the images of the strips is recorded on the photosensitive surface, and reproducing the object images as color pictures by the diffraction orders of the strip grating.

The filter strips may have different width or different angular positions.

In order to obtain during the reproduction sufficient diffraction phenomena, the grating constants of the lenticular grating must be very high. Therefore, in addition to the known lenticular gratings consisting of synthetic materials, photographically made gratings are suitable, which are produced by exposing a corresponding sinusoidal strip grating on a suitable photosensitive layer which is then developed and rehalogenized. Lenticular gratings produced in this manner have not only an outer modulation, but also a periodic variation of the index of refraction, which has the effect of a cylinder lens when lighting of suitable intensity is used.

A black and white picture produced in accordance with the improved method on a photosensitive surface can be developed in the usual manner, and printed as a contact pring, or reproduced in any other manner without any noticeable loss of picture quality.

For this purpose, the images on the photosensitive layer are illuminated by a source of light which is as point-shaped as possible, which is imaged by a condenser on an intermediate diaphragm. When the image carrying photographic layer is disposed behind the condenser, pronounced diffraction effects take place, which can be either filtered, or used for producing a picture.

The novel features which are considered as characteristic of the invention are set forth in particular in the appended claims. The improved method itself, however, together with additional features and advantages thereof, will be best understood upon perusal of the following detailed description with reference to the accompanying drawing.

DESCRIPTION OF THE PREFERRED EMBODIMENTS

Figure 1:
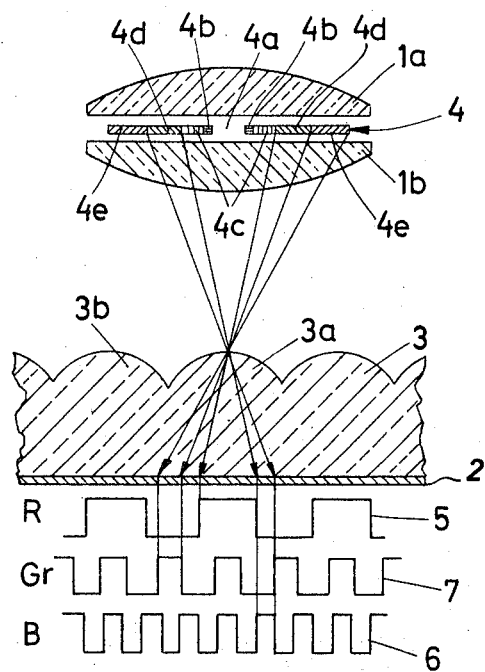
FIG. 1 is a fragmentary schematic sectional view illustrating a first embodiment of an apparatus wherein colors are recorded by means of different grating constants, and including a diagram showing the distribution of the color components.
Figure 2:
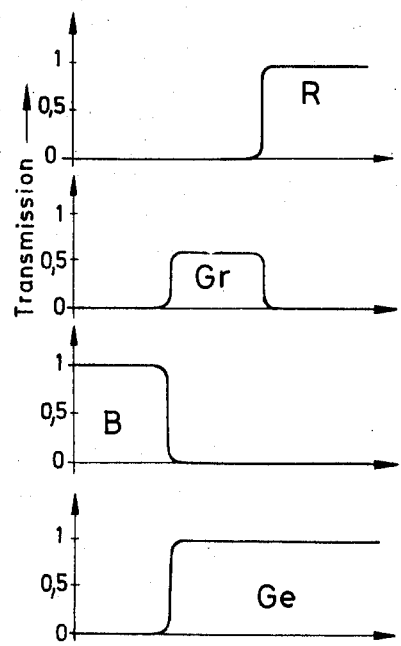
FIG. 2 is a diagrammatic view graphically illustrating the light permeability and transparency of the filter strips used in the apparatus of FIG. 1.

Referring first to FIGS. 1 and 2, an objective has front and rear parts 1a and 1b which form a real image of an object located forwardly of the lens part 1a on a photosensitive surface 2 provided on a black and white film having very high resolution and good modulation transmission. A lenticular grating 3 has a planar surface in direct contact with the photosensitive layer 2 and comprises lens elements 3a and 3b which are cylinder lenses having such a power of refraction that a set 4 of filter strips is sharply and accurately imaged on the photosensitive layer 2. The lenticular grating 3 has, for example, 60 lens elements per millimeter, and this fine pitch favorably influences the quality of the picture.

Objective 1a, 1b has a plane of symmetry passing through the optical axis and parallel to the axes of the lens elements 3a, 3b. The set of filter strips 4 consists of four pairs of filter strips, namely an innermost pair of filter strips 4b which define between each other a strip-shaped area 4a, and further pairs of filter strips 4c, 4d, and 4e, the filter strips of each pair being arranged symmetrically with reference to the plane of symmetry and parallel to each other. The area or strip 4a is permeable for all three color components and is flanked by two very narrow yellow filter strips 4b which, as is apparent from FIG. 2, completely absorb the color component blue. A pair of filter strips 4c is associated with the color component red, and since the central strip 4a, and the yellow filter strips 4b are also permeable for red light, the cylinder lens 3a images a continuous red strip symmetrical to the axis of the cylinder lens 3a, and shown as part of the graph 5 in FIG. 1, while the permeability for the red light is indicated in the uppermost portion of FIG. 2.

Outwardly of and adjacent to the red filter strips 4c, blue filter strips 4d are provided whose width is selected so that the blue stripe adjacent the red stripe has a width which is only one-third of the width of the red stripe imaged by the lens element 3a, as is apparent from the graph 6 in FIG. 1. The outwardly following green filter strips 4e have a light transmission of 0.5, as indicated at Gr in FIG. 2 which is half the light transmission of the other color components. This lower light transmission is selected because in the arrangement of FIG. 1, the green stripes imaged by adjacent lens elements 3a, 3b are superimposed on each other so that the two images together result in sufficient intensity of the green color component.

The same effect could be obtained if each of two adjacent lens elements 3a, 3b would image a green stripe of only half the width of the illustrated green stripe, but having full intensity, provided that the two green stripes of adjacent lens elements are directly adjacent each other. In both cases, the graph 7 represents the distribution of the images of the green filter strips.

All images of the strips 4 formed by all lens elements of the lenticular grating 3 form on the photosensitive surface 2 a strip grating. When the film is exposed, the brightness values of the object imaged by the objective 1a, 1b are superimposed on the colored strip grating so that the latter is correspondingly modulated. After exposure of the photosensitive layer of film 2, the same is separated from the lenticular grating 3 and developed in the usual manner, so that a black and white picture appears on the photosensitive surface. In addition, three superimposed strip gratings extending in the same direction are visible on the film.

The manner in which the three color informations with the associated color values are reproduced is disclosed in our application, Ser. No. 803,676 and will be briefly described with reference to FIG. 5. A source of light 8, which should be as small and point-shaped as possible, is imaged by a condenser 9 on an intermediate diaphragm 10 which has two diametrically spaced openings. The developed film 11 having the photosensitive surface 2 with images as described above is placed directly behind the condenser 9 and is imaged on a screen 13 by an objective 12 which is arranged as closely as possible to the diaphragm 10. The image of the lamp 8 is projected by condenser 9 into the plane of the diaphragm 10. Outside of the place of a direct image, which may be described as the zero diffraction order, concentrations of light, the so-called higher diffraction orders, are formed at different points of the plane of the diaphragm 10, depending on the fineness and direction of the strip grating on the photosensitive surface of the film 11. If the grating is strictly sinusoidal, only the first diffraction order is produced, while gratings having harmonic characteristics of the higher order cause diffraction phenomena of the higher orders.

The radial deviation of the diffraction from the optical axis is determined by the fineness of the grating and by the angular position of the diffraction brightness in relation to the azimuthal position of the grating. By selecting the grating constant and angle, it can be determined where the respective diffraction order occurs in the plane of the diaphragm. Therefore, it is convenient to refer to a local frequency spectrum, while the grating effects the transfer of information regarding the picture in the manner of a carrier frequency.

Since the diaphragm 10 has an impermeable central portion, a direct image of the source of light in the plane of the diaphragm is blocked, while the rays of the higher diffraction orders are projected through the corresponding openings in the outer portions of the diaphragm 10 through objective 12 onto the screen 13. In this manner, a picture of the object imaged on the photosensitive surface of film 11 is formed on the screen 13 only by rays produced by diffraction phenomena.

Since by the grating constant of the several gratings associated with different color components, the angular deflection from the optical axis, or the radius of the mean deviation is determined, the position of the light concentration of every color component, and of every diffraction order in the intermediate diaphragm plane is determined. Therefore, the diaphragm plane may be referred to as selection plane for the local frequency. By arranging the color filter strips of the respective color at these points, the result can be obtained that only light pertaining to the respective color component reaches the objective 12 and is projected onto the screen 13 on which the color picture composed of the color components is formed.

Figure 3:
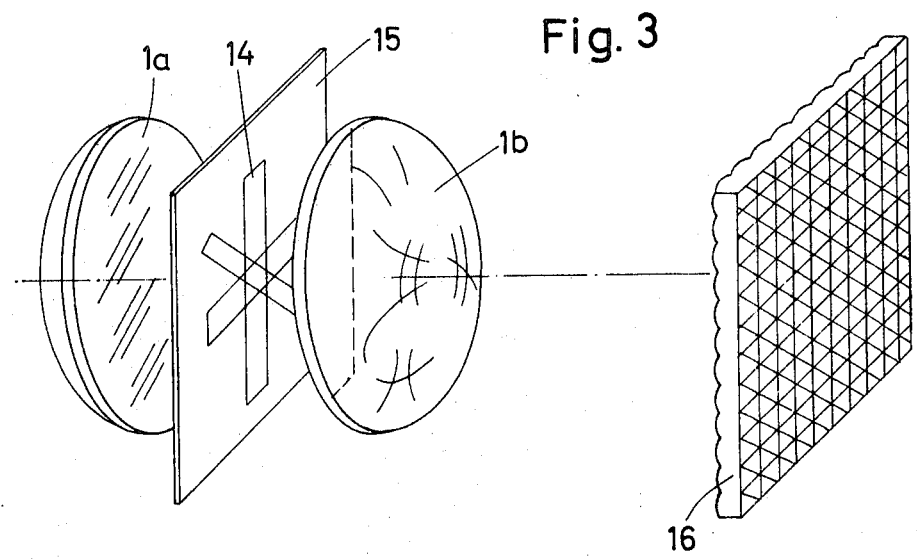
FIG. 3 is a fragmentary schematic perspective exploded view illustrating a second embodiment of the apparatus wherein the filter strips are angularly displaced.
Figure 4:
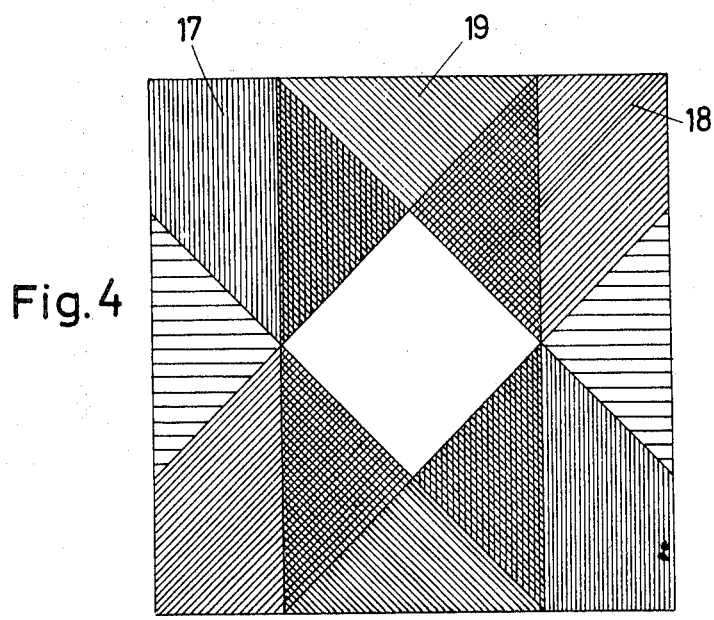
FIG. 4 is a view illustrating the positions of the filter strips in the apparatus of FIG. 3.

In the apparatus of FIGS. 3 and 4, the objective also consists of front and rear portions 1a and 1b between which a set of strips 14 is disposed in the objective plane 15. A lenticular grating 1b consisting of perpendicularly crossing rows of spherical lens elements is provided in the front of a photosensitive surface, not shown, as described with reference to FIG. 1. As in the embodiment of FIG. 1, the objective 1a, 1b forms a black and white image on the photosensitive surface, while the set of filter strips 14 is imaged by each lens element of the lenticular grating 16 on the corresponding square area of the photosensitive surface so that a strip grating is exposed and recorded on the photosensitive surface. FIG. 3 shows schematically that three filter strips associated with three color components cross each other in the optical axis of objective 1a and 1b. FIG. 4 more clearly shows that the set of filter strips 14 includes a diagonally extending filter strip 17 permeable for green light, and another diagonal filter strip 18 permeable for blue light and crossing the filter strip 17 at right angles. A third filter strip 19 extends at an angle of 45° to the green and blue filter strips 17 and 18 and is permeable for red light. Filter strips 17 and 18 have the same width, and the filter strip 19 has a greater width which is $\sqrt{2}$ times the width of the filter strips 17 and 18. The color components occur only where there are no strip portions superimposed. Where the red and blue strips overlap, the filter color is purple, where the green and red strips overlap, the filter color is yellow, and in the central square in which all three strips 17, 18, 19 overlap, all colors can pass through the filters. The outer ends of the filter strips 17, 18, 19 are shaped so that the entire set of filter strips has a square area. When this square area is imaged by each of the lens elements of the lenticular grating 16 on a photosensitive surface, corresponding square areas of the surface receive images which together form a strip grating on the entire photosensitive surface since the imaged square areas are directly adjacent to each other. The photosensitive surface has thus the image of three color-modulated strip gratings slanted at the same angles as the filter strips 17, 18 and 19.

The lenticular grating 16 which is composed of crossing rows of square spherical lenses can be made by a stamping operation from synthetic plastic material. It is also possible to produce the lenticular grating by a photographic process. As has been found by tests, the quality of reproductions obtained by photographically made lenticular gratings is sufficient for the purpose of the invention. Lenticular grating made by a photographic process can be made to a very fine pitch which is advantageous since the area of each image picture element must conform to the size of the respective lens element so that a lenticular grating having a fine pitch is required for high quality reproductions.

Figure 5:
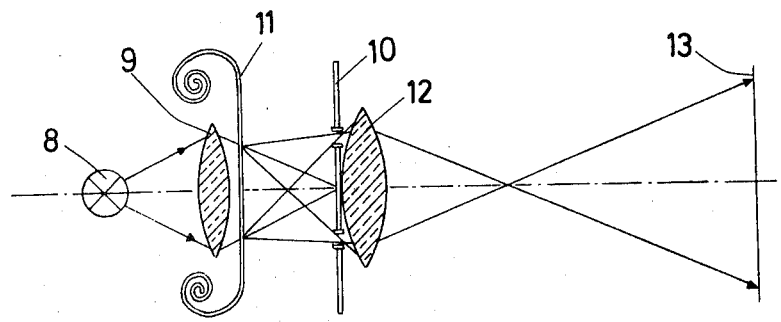
FIG. 5 is a fragmentary schematic view illustrating an apparatus for reproducing pictures made in accordance with the embodiments of FIGS. 1–4.
Figure 6:
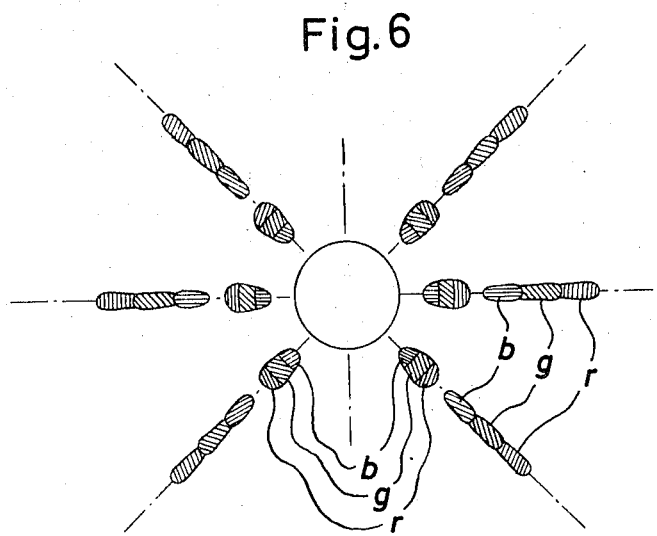
FIG. 6 is a schematic view illustrating the distribution of the color components in the diaphragm plane of FIG. 5.

For obtaining a color picture of a photosensitive layer exposed by the apparatus of FIG. 3, the apparatus described with reference to FIG. 5 can be used. As illustrated in FIG. 6, successive brightness concentrations occur at different angles in the diaphragm plane 10, which are respectively correlated with one of the three color components. The angles between the brightness concentrations correspond to azimuthal angular positions of the diffraction gratings. At each of the brightness concentrations, in a direction from the center outward, the color components blue, green and red with the known intermediate colors occur at the first diffraction order, and are repeated in the second diffraction order. This affords the possibility to arrange a diaphragm in this plane which permits the passage of color which is correct for the reproduction of the respective color component, but absorbs the remaining colors. In the plane of the picture screen 13, the objective 12 forms a picture combining the three color components. A particular advantage of the arrangement is that by adjusting the apertures of the diaphragm, or by neutral filters, the color components can be balanced.

The reproduction of the black and white pictures recorded in accordance with the invention, can be carried out by other arrangements and holographic methods, and forms no part of the present invention.

Instead of exposing on the photosensitive layers three color component images, as described above, it is also possible to expose different black and white images on the photosensitive surface. A grating having a variable grating constant is used for each exposure, or the grating may have different azimuthal angular positions during each exposure. A gap in the plane of the objective is imaged in different positions by each lens element of the lenticular grating so the different gratings are superimposed on each black and white image, or the angular position of the gap in the plane of the objective is placed in a different angular position during each exposure, corresponding to the method applied in the embodiment of FIGS. 1 and 3, respectively. The separation of the three black and white pictures during the reproduction is effected, as described with reference to FIG. 5, by apertures in the diaphragm 10, and by the respective diffraction orders.

While the invention has been illustrated and described as embodied in a method and apparatus for photographic recording on a black and white film in such a manner that color reproduction can be obtained, it is not intended to be limited to the details shown, since various modifications and structural changes may be made without departing in any way from the spirit of the present invention.

What is claimed as new and desired to be protected by Letters Patent is set forth in the appended

1. A method of photographic color recording and reproduction, comprising the steps of forming by an objective a photographic object image on a photosensitive surface which is sensitive to white light; forming by a lenticular grating having a frequency of at least 60 lines per millimeter a plurality of color images of a set of differently colored filter strips located at least behind parts of the objective so that said strips absorb the respective color components of light and strip grating composed of the images of said strips is recorded on said photosensitive surface and is overlapped by the object image on said surface; developing said photosensitive surface; and reproducing said object image on the developed photosensitive surface as a color picture by the diffraction orders of said strip grating.

2. A method as defined in claim 1, wherein said filter strips have different widths.

3. A method as defined in claim 1, wherein said filter strips have different angular positions.

* * * * *